United States Patent
Baptista et al.

[11] Patent Number: 5,851,271
[45] Date of Patent: Dec. 22, 1998

[54] DEVICE FOR FILTERING AND HUMIDIFYING AN AIR FLOW

[76] Inventors: Fernando A. Baptista, Rua Pádua Correia, P-4400 Vila Nova de Gaia, Portugal; João M. Pereira Dias Baptista, Avenida Padre Sá Pereira, P-4740, Portugal

[21] Appl. No.: 682,632
[22] PCT Filed: Aug. 2, 1994
[86] PCT No.: PCT/PT94/00007
 § 371 Date: Aug. 2, 1996
 § 102(e) Date: Aug. 2, 1996
[87] PCT Pub. No.: WO95/04587
 PCT Pub. Date: Feb. 16, 1995

[30] Foreign Application Priority Data

Aug. 6, 1993 [PT] Portugal ................................. 101332

[51] Int. Cl.[6] ........................... B01D 47/16; B01D 47/18
[52] U.S. Cl. ............................... 96/286; 96/291; 96/294; 96/297; 261/89; 261/90
[58] Field of Search ........................ 261/89, 90; 55/233, 55/240; 95/211; 96/281, 282, 286, 291, 296, 297

[56] References Cited

U.S. PATENT DOCUMENTS

| | | | |
|---|---|---|---|
| 789,247 | 5/1905 | Zellweger | 261/89 |
| 838,602 | 12/1906 | Zellweger | 261/89 X |
| 1,039,677 | 9/1912 | Theisen | 261/90 |
| 2,259,762 | 10/1941 | McKee | 261/90 X |
| 2,698,745 | 1/1955 | Boucher | 261/90 |
| 2,803,309 | 8/1957 | Baker | 261/90 X |
| 2,941,872 | 6/1960 | Pilo et al. | 261/89 X |
| 2,944,801 | 7/1960 | Katz et al. | 261/90 X |
| 3,670,478 | 6/1972 | Welsh et al. . | |
| 4,692,283 | 9/1987 | Wem et al. | 261/89 |
| 5,363,909 | 11/1994 | Acharya et al. | 261/89 X |

FOREIGN PATENT DOCUMENTS

| | | |
|---|---|---|
| 1202388 | 1/1960 | France . |
| 2056320 | 5/1971 | France . |
| 967812 | 12/1957 | Germany . |
| 1298871 | 9/1969 | Germany . |
| 560172 | 3/1944 | United Kingdom . |

*Primary Examiner*—Richard L. Chiesa
*Attorney, Agent, or Firm*—Hoffman, Wasson & Gitler

[57] ABSTRACT

A device for simultaneously filtering and humidifying an air flow uses an outer casing having a rotatable, reticulated filtering element. The air flow enters the casing and must pass through the filtering element by making abrupt change in directions. Particles in the air flow, due to their greater inertia, will not be able to follow the air flow and, therefore, will not pass through the filtering element. There are expelled through an opening. The air flow exists through an outlet that is within the perimeter of the filtering element. A water projector serves to both humidify the air flow and wetten the filter elements surface in order to capture particles in the air flow.

6 Claims, 1 Drawing Sheet

EXAMPLE 1

EXAMPLE 2

DEVICE FOR FILTERING AND HUMIDIFYING AN AIR FLOW

FIELD OF THE INVENTION

The invention pertains to a device for filtering and humidifying an air flow. The device simultaneously performs: the function of retention of particles in suspension in the flow, the function of gathering and transporting those particles to the exterior, and the function of humidifying the air flow.

BACKGROUND OF THE INVENTION

In devices already known, the filtering and humidifying functions are performed separately, by different devices, each requiring periodic maintenance.

In filtering devices for air suspended particles, the process for the retention of the particles consisted until now, in the interposition of a filtering material on the air flow. The filtering material is made up of a reticulation of appropriate fibers, arranged in a way to have smaller pores than the dimension of the particles whose retention is intended.

However, the efficiency of this process is poor, because particles that are smaller than the pores of the filter material are not retained. The efficiency further degrades due to the accumulation of particles which fill the area of the reticles, making the flow of air increasingly difficult, if the replacement of the filtering material does not take place.

In air humidifying devices, a process has been used which consists of submitting water to a high frequency movement, obtained by electromagnetic action.

In the processes included in previous techniques, in which water is used for the retention of the particles, the water is sprayed, thus resulting in formation of droplets of water with different volumes, from micro to macro-droplets.

Another technique is the use of high rotational speed of a processing chamber which creates a high centrifugation effect. The retention of particles is obtained from being absorbed by the water droplets which undergoes strong impacts and repeated rebounds as a consequence of the kinetic energy related to the speed of the rotation movement which is applied.

The result of this system is that an important fraction of water involved is transformed in micro-droplets which retain part of the particles because the surface tension of these micro-droplets has a high value due to its very small mass.

These micro-droplets remain in suspension and go along with the air in its path thus constituting a kind of "fog" with physical characteristics similar to those of the well known "London smog".

This heavily diminishes the efficiency of any process that adopts the system of using, side by side, the spraying of water with an high centrifugation.

SUMMARY OF THE INVENTION

According to the invention, all the problems which are mentioned above, related to filtering devices, are avoided with the substitution of the static process of interposition of a porous material by a dynamic process, which consists of the simultaneous performance of the function of retention of the particles in suspension in the flow, the function of their gathering and transportation, and the function of humidifying the air of the flow, by the action of the movement of the flow itself and the action of water jets and the use of rotating structures.

The function of retention of the particles is fulfilled, by a reticulated structure and by a set of narrow paths, whose walls exhibit rugosities, collecting and distributing the circulation of the air flow. Each one of these paths is shaped in a way that produces at least one sudden change in the direction of the flow circulation, with a very marked angle in a small radius. This causes the collision of the particles against the walls of the circulation paths, and from this, since the value of the inertia of the particles is greater than the inertia of the air, the particles will not be able to change direction according to the same angle and the same radius as the path.

This effect is complemented by the humidification of the paths, which produces an attractive action over the particles that corresponds to the surface tension of the water.

The movement action resulting from the emission of water jets directed against the reticulated structure, with a dispersive effect in the circulation paths of the flow. This aids the retention of the particles and performs the function of gathering and transportation of those particles.

The function of humidifying the air of the flow results from the strong scattering of the water on the surfaces of the narrow paths which aid a close contact between the water and the circulating air.

In the process included in the invention, the purpose is to prevent the build up of the droplets, rather than the total dispersion of the water in the form of droplets.

The function of the dispersive water projectors is solely to take along the distribution of the water on the reticulated surface in the most uniform fashion allowed by their manufacturing technique.

By this way it has already been achieved that the thickness of the cross section of the water jets was limited to one tenth of a millimeter with a ten millimeter width, that is, a thickness/width ratio of one to one hundred.

The final target is to have, for the water jet, a thickness corresponding to the minimal water jet thickness still able to effectively wet the reticulated surfaces.

The rotation speed of the assembly which includes the reticulated surfaces is very low, being just enough to complement an uniform water distribution thus ensuring that the energy related to the corresponding centrifugal effect is not enough to induce strong impacts and repeated rebounds from which would result in the build up of micro-droplets.

The inertia effect of the particles, having a not negligible value, corresponds only to the speed of the air flow that carries them and their retention does result from their contact and attraction with the water film that keeps the reticulated surfaces wet.

The humidifying of the air flow is due only to the natural evaporation of water, intensified in accordance with the speed of the air flow. This situation is similar to the natural evaporation of water retained in porous materials (like fabrics) exposed to the wind.

The applicability of the referred effects and actions, is explained and established next, with the help of the detailed description of two illustrative examples which have not a limitative character, of the conception of devices that perform in a better suited manner the present invention. These examples are illustrated by the attached drawings:

DETAILED DESCRIPTION OF THE INVENTION

Figure 1:
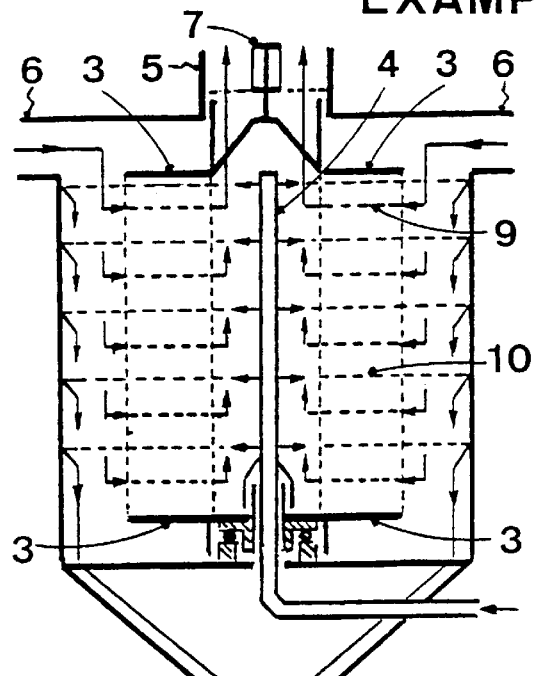
FIG. 1 is a cross section of a first embodiment.

FIG. 1 depicts a first embodiment of the invention, through a cut longitudinal to the rotation axis, representing a preferred shaping of the reticulated structure 3 a shaping of the dispersive water projector 4, which also illustrate the positioning of the means 7 that provide the rotation of the reticulated structure and of the casing that surround these components. The casing is provided with openings 6, an outlet 5 to allow the circulation of the flow and an outlet 8 for the removal of the particles. The figure displays the lines and direction of the circulation of the air flow 9 and the lines and direction of the projected water 10.

Figure 2:
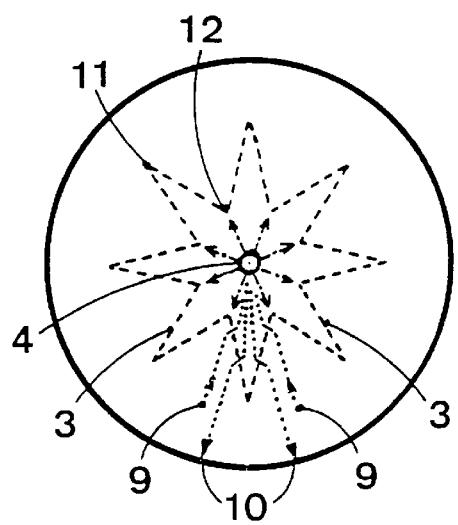
FIG. 2 is a top view of the first embodiment.

FIG. 2 also depicts the first embodiment, through a cut transversal to the rotation axis, representing a preferred shaping of the reticulated structure have peaks and valleys 11, 12, the centered position of the dispersive-projector of the water 4 and the indication of the opposite directions that are followed by the circulation of the air flow 9 and by the circulation and dispersion of water 10 when it crosses the reticulation in the structure.

Figure 3:
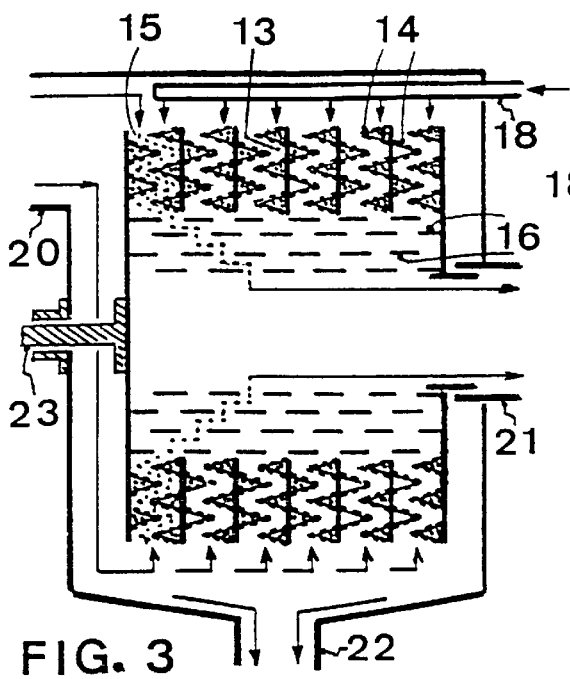
FIG. 3 is a cross section of a second embodiment.

FIG. 3, depicts a second embodiment of the invention, through a cut longitudinal to the rotation axis, representing a preferred shaping of the reticulated structure 13, 14, a shaping of the dispersive water projector 18, preferred shaping of cylinders with perforated slits 16, a casing that surround these components provided with inlet 20, outlet 21 for the air flow and outlet for the removal of particles 22. The figure also display the direction and reversal of the circulation of the air flow 15 and the positioning of means 23 providing the rotation of the reticulated structure.

Figure 4:
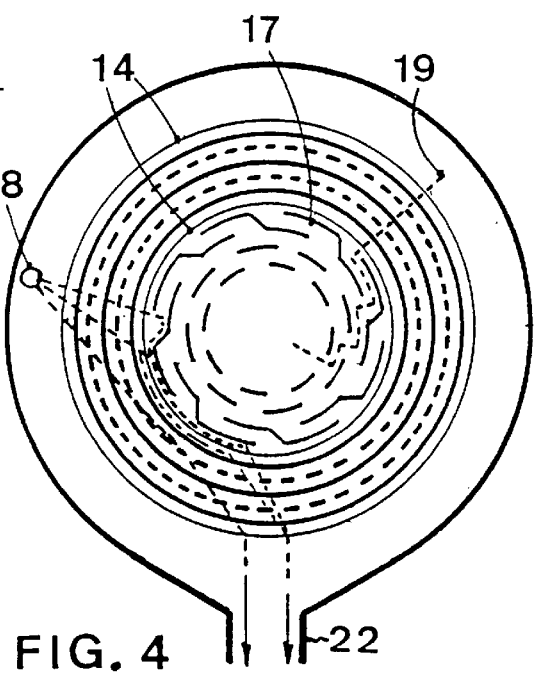
FIG. 4 is a side view of the second embodiment.

FIG. 4, shows the second embodiment, through a cut transversal to the rotation axis, representing a preferred shaping of the reticulated structure 14, a preferred positioning of the dispersive-projector 18, the preferred shaping of cylinders with perforated slits 17 and the direction and reversal of the circulation of the air flow in the perforated cylinders 19.

The reticulated structure of the first embodiment 3 is made from an enduring material with a reticulated texture, preferably an extent of metallic net. The area of each reticulum is in accordance with the average dimension of the particles in suspension in the air flow. It has been found that an area of less than 1 mm$^2$ works best.

A preferred shaping of the structure is the one that results from a certain number of folds, made up in alternating radial directions. The structure has vertices of the folds, inner 12 and outer 11, become equidistant from each other and have a common rotation axis.

The resulting structure is provided with lids at both sides, one of them being provided with one opening which is equal to the direction of the inner vertices, to allow the air flow.

The dispersive water projector 4 is positioned parallel to the rotation axis of the reticulated structure and is made up of an elongated structure, preferably a tube with several series of thin peripheral slits distributed in a regular manner along its length. These slits, fed by water at adequate pressure create water jets whose cross section has the thickness or size of a thin blade, directed against the inner surface of the reticulated structure (10).

The air flow, with particles in suspension, is admitted at the inlets 6 of the casing of the device, then is distributed to surround the outer area of the reticulated structure, circulates between the faces of the folds, takes an average direction which makes a pronounced angle with the face of the reticles. To cross these reticles and enter the inner collector it has to change direction abruptly over that pronounced angle within an extremely short radius. That is, the air quickly changes from a radial direction to a tangential direction once it has moved between two vertices 11 of the structure.

The air has less mass than the particles and so less inertia, which allows it to change direction easier. The particles have higher mass and, because of that, a higher value of inertia, can not change direction within the same angle and radius, and so they collide against the wet walls of the reticles, where they are kept bounded by the attraction of water due to the water surface tension.

This action is assisted by the centrifuge effect that is associated to the particles by the rotational movement of the reticulated structure. This effect has an action in the opposite direction of the particles circulation.

The dispersive action of water resulting from the impact of the water jets against the reticulated structure which has an opposite direction 10 relative to the flow circulation 9 also assists the action of retention of the particles and, at the same time, take over its gathering and removal out of the device 8.

Referring to FIG. 3, the preferred shaping of the reticulated structure for the second embodiment results in the grouping of a number of elements, each one of them with the shape of a continuous and circular band. Each band has a face several series of recesses 13 and saliencies 14 all mutually concentric and concentric with the band.

The grouping of the bands is carried out in a way the bands mirror each other and remain parallel with an adequate mutual spacing in order to keep, between two neighbor elements, space 15.

Each one of these spaces, being narrow and with repeated changes in the direction of the circulation, perform as a number of reticles. The effect of inertia is felt intensely since the angles corresponding to the change in direction of the air flow are very pronounced.

One important advantage of this kind of shaping of a reticulated structure is due to the possibility of including a larger reticulated area inside the same space, so as to obtain smaller devices for a given filtering capacity.

The preferred shaping of cylinders with slits are those depicted by the figures displaying the fact that the relative position of the slits alternates from cylinder to cylinder, for the axial position 16 and for the radial position 17.

The dispersive water projector has the same features as the one which is described in the first embodiment, being distinct, only, in its position regarding the reticulated structure since it is placed in its exterior 18, parallel to the rotation axis, not coincident with it.

The air flow, with particles in suspension, is admitted at the inlet 20 on the case of the device, distributes itself as to surround the reticulated structure and circulates along each of the inter-spaces 15.

The particles in suspension in the flow, due to their larger value of inertia can not navigate the successive and narrow turning angles during its circulation along each of the spaces, colliding against their walls which, being constantly wet, operate the retention of the particles.

The dispersion of the water from the jets performs, as in the first embodiment, the function of humidifying the intervallic spaces and that of the perforated surfaces of the cylinders.

The function of the cylinders with slits 17 is to retain the drops of water, originated from the jets, which go beyond the reticulated structure and support an extension of the surfaces through which water evaporates.

Due to the drawing of the slits and to the axially displaced relative position from cylinder to cylinder, the drops of water, due to its inertia, are not able to navigate the strongly curved path imposed by the sudden change in the direction of their circulation 19, breaking up on the surface of the first cylinder, forming a thin film of water. One part of this evaporates another part reaches the edges of the slits, is taken by the flow and breaks on the surface of the next cylinder; the remaining water is collected in the down part of the cylinder and, due to its weight, returns to the reticulate and join the water that retained and transported the particles 22.

The drops taken by the flow to the second cylinder, as they are originated from a much thinner film of water, have now a very small diameter, but their inertia is still enough to distribute over its surface setting up, on the second cylinder, a new area for evaporation. This operative way repeats regarding the third cylinder and could repeat successively, depending only upon the level of humidity required for a certain volume of air.

As it can be seen from the description of these examples of devices, the first embodiment will preferably be used for the retention of particles of greater size and for a low level of humidity. The second embodiment will preferably be used for the retention of thinner particles and for a higher level of humidity.

Devices according to the first example can be used with very good efficiency in the retention and gathering of dust and other industrial residues, thrown into the atmosphere through the chimneys of a great of industrial plants. For this reason from the use of these devices it will result an remarkable reduction of the atmospheric pollution.

Devices according second embodiment can be used, with remarkable advantage, on conditioned air circuits and on industrial situations requiring dust free and humidified air.

We claim:

1. An air filtering and humidifying device comprising;

an outer casing having an air inlet and an air outlet;

a water projector extending into the outer casing;

a rotatable, reticulated filter element having an inner and outer surface inside the outer casing;

the filter element comprising a first cylinder, the first cylinder made from a series of axially spaced continous bands circular, each band formed by concentric elements joined together;

each element extending radially inwardly and adjoining elements having a different axial direction.

2. The device of claim 1 wherein;

the filter element has a second cylinder, concentric with the first cylinder, the second cylinder having slits.

3. The device of claim 2 wherein;

the filter element has a third cylinder, concentric with the first cylinder, the third cylinder having slits which are axially displaced from the second cylinder slits.

4. The device of claim 1 wherein;

the water projector projects water toward the outer surface of the filter element.

5. The device of claim 1 wherein;

the outer casing has a drain for the expulsion of particles.

6. The device of claim 1 wherein the water projected is parallel to the axis of rotation of the filtering element.

* * * * *